June 24, 1941.　　H. T. KRAFT ET AL　　2,246,979
FRICTIONAL TORQUE TRANSMITTING DEVICE
Filed Oct. 30, 1939　　3 Sheets-Sheet 1
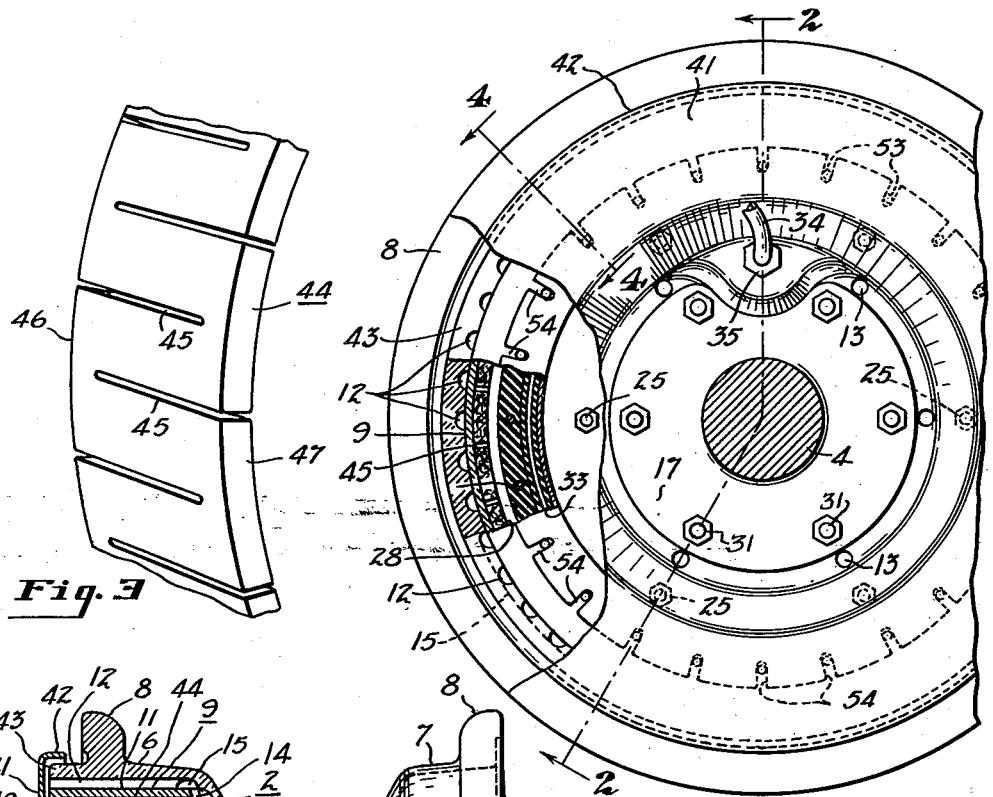
Fig. 1
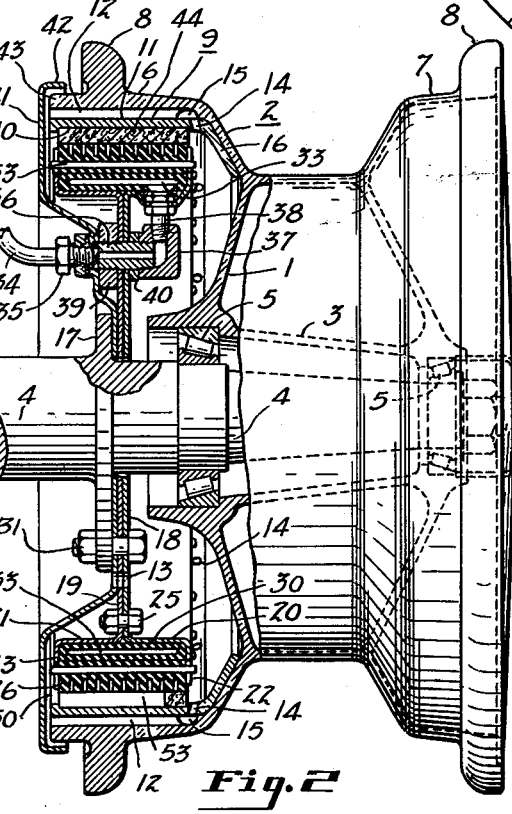
Fig. 3
Fig. 2
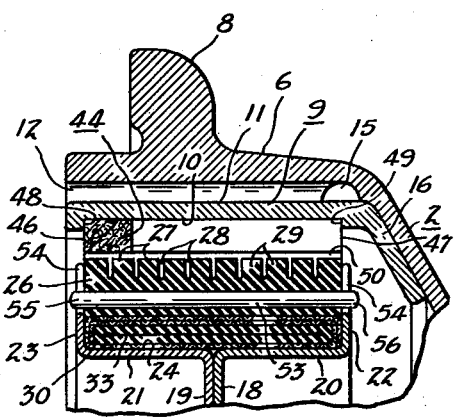
Fig. 4
INVENTORS
Herman T. Kraft
William C. McCoy
BY Evans + McCoy
ATTORNEYS June 24, 1941.  H. T. KRAFT ET AL  2,246,979
FRICTIONAL TORQUE TRANSMITTING DEVICE
Filed Oct. 30, 1939  3 Sheets-Sheet 3
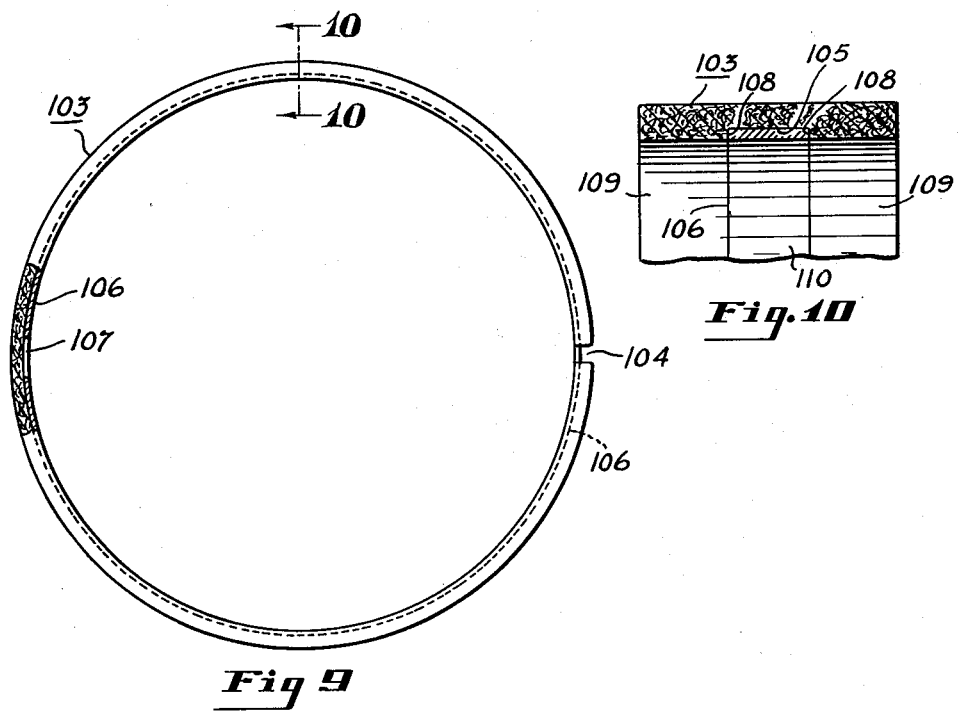
INVENTORS
*Herman T. Kraft*
*William C. McCoy*
BY *Evans + McCoy*
ATTORNEYS Patented June 24, 1941

2,246,979

UNITED STATES PATENT OFFICE 2,246,979

FRICTIONAL TORQUE TRANSMITTING DEVICE

Herman T. Kraft, Akron, and William C. McCoy, Shaker Heights, Ohio, assignors to The General Tire & Rubber Company, Akron, Ohio, a corporation of Ohio Application October 30, 1939, Serial No. 301,970

14 Claims. (Cl. 188—152)

This invention relates to friction devices, and more particularly to constructions of this character for resisting relative rotational movement between members.

Frequent use is made of devices in which a friction element on one member is forced into engagement with a friction face on another member so as to frictionally resist relative movement between the members. A common application is in connection with clutches and brakes. In such devices a deformable or movable friction element may be disposed within the inwardly directed friction face of a drum or the like so that upon radial outward movement of the friction element, the same is brought into frictional engagement with the drum face. Where the friction element and drum are rotating at different speeds and the torque load is great, considerable circumferential deformation or distortion of the friction element may result. This is particularly true in brakes and clutches which employ a friction element formed of a resilient or elastic rubber compound. Numerous devices may be employed in friction devices of the character mentioned for relieving the rubber friction element of the torque loads. It is desirable, however, that the rubber friction element itself remain one of the relatively movable parts and form one of the friction surfaces through which the drive connection is established.

It is, therefore, the principal object of the present invention to provide a friction device of the character mentioned in which a deformable friction element, preferably of rubber or like material, has a friction surface arranged to engage the friction face of a member movable relative to the friction element, and retaining means are incorporated or embedded in the rubber or like body of the friction element to reinforce the same against objectionable displacement or shifting while the faces of the device are frictionally engaged. More specifically, the invention aims to provide a deformable rubber friction element having retaining pins embedded therein and interlocked with the supporting member for the friction element so that the pins resist shifting of the friction element on the member.

Another object is to provide a deformable rubber friction element movable toward a friction face, in combination with means responsive to deformation or shifting of the friction element to force the same against the friction face.

Another object is to provide a friction device for resisting relative rotational movement between members, which includes a slide element interposed between the members so as to absorb or carry the torque load frictionally transmitted from one member to another.

The invention also aims to provide improvements in friction devices of the character described which are used as vehicle wheel brakes, so that the heat frictionally generated may be more quickly and safely dissipated to the atmosphere. Other objects and advantages will become apparent from the following detailed description of suitable embodiments of the invention made in connection with the accompanying drawings, in which like parts throughout the several views are indicated by the same numerals of reference.

Figure 1 is an elevational view, partly in section and with parts broken away, showing an airplane wheel assembly having a brake structure incorporating the principles of the invention;

Fig. 2 is a sectional view, partly in section and with parts broken away, taken substantially on the line 2—2 of Fig. 1;

Fig. 3 is a fragmentary perspective view showing a portion of the annular slide element or ring which is interposed between the brake drum and the deformable friction element;

Fig. 4 is a sectional detail taken substantially on the line 4—4 of Fig 1 and enlarged with respect thereto. In this view the friction element is contracted so as to be disengaged from the slide element while in Figs. 1 and 2 the friction element is shown expanded into engagement with the slide element;

Fig. 9 is a side elevational view, partly in section, of a modified form of slide element suitable for use in friction devices of the character disclosed herein; and Fig. 10 is a sectional detail taken substantially on the line 10—10 of Fig. 9 and enlarged with respect thereto.

Figure 5:
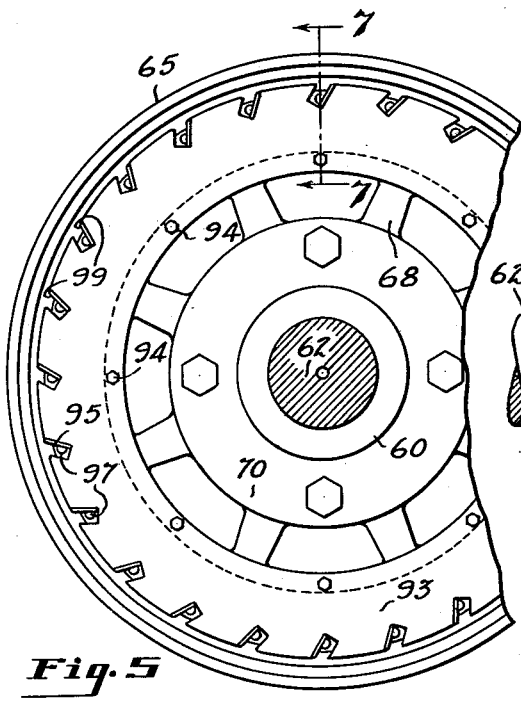
Fig. 5 is an end elevational view, partly in section and with parts broken away, showing a modification of the invention as the same is incorporated in a pneumatic clutch.

The brake shown in Figs. 1 through 4 comprises a wheel structure having a body portion 1, a drop center rim 2, and a hub 3, the latter being rotatably received on a spindle or shaft 4 and carried by bearings 5. The rim 2 is formed with spaced circumferential seats 6 and 7 that receive the beads of a pneumatic tire, not shown. Radially extending flanges 8 adjacent the bead seats 6 and 7 retain the tire beads on the wheel rim in the usual manner.

Disposed within the portion of the rim forming the bead seat 6 is an annular drum member 9 formed with a substantially cylindrical inwardly directed friction face 10. Outer surface 11 of the drum 9 is directed toward and may seat against the inside of the rim 2 which is formed with a series of spaced parallel axial disposed channels or grooves 12. The outer ends of these grooves are open, as shown in Fig. 1, and their inner ends communicate with a circumferentially extending groove 15, which permits the circulation of air through the grooves 12 to cool the drum 9 when the latter is heated by friction, as will later appear. A flange or flanges 16 is formed on the drum 9 and disposed flatwise against the wheel rim 2. The wheel rim and flanges 16 may be secured together by suitable means such as welding or rivets, not shown. Preferably, the main structure of the wheel, including the body 1, rim 2, and hub 3, are formed of relatively light material such as aluminum and its alloys, while the brake drum 9 is formed of a stronger material more resistant to wear, such, for example, as cast iron or steel.

The shaft or spindle 4 is formed with a collar 17 to which a stationary member comprising pans 18 and 19 is secured by bolts 31. The pans 18 and 19 are disposed in back to back relation and are formed respectively with cylindrical portions 20 and 21 and radially outwardly directed flange portions 22 and 23. The cylindrical portions 20 and 21 of the pans are of approximately the same diameter and form bottom 24 of an annular channel, the sides of which are formed by the flanges 22 and 23, and which is directed toward the friction face 10 of the brake drum 9. Preferably, means such as bolts 25 is provided to secure the pans together adjacent the cylindrical portions 20 and 21, thus preventing the pans from being split apart under extreme torque loads or pressures.

Received between the side walls or flanges 22 and 23 of the channel is an annular elastic friction element 26 made of a suitable deformable material such as rubber or the like. This element is annular in extent and has an outwardly directed friction surface 27 disposed in spaced concentric relation with respect to the inwardly directed friction surface 10 of the brake drum. Desirably, the friction element is formed with suitable formations such as deep narrow grooves 28, which are formed in the face 27 and extend circumferentially about the element, thus providing a multiplicity of relatively thin flexible ribs 29 which are laterally unstable and annular in extent.

Between the friction element 26 and the bottom 24 of the channel in the stationary member is an inflatable tube or bag 30 which may be formed of rubber or similar flexible fluid-tight material. Fluid under pressure may be introduced into chamber 33 of the annular bag 30 from a suitable source of supply through a conduit 34 which may be flexible if desired. This conduit is attached by means of a fitting 35 to a tubular conduit 36 threaded into an elbow 37 which receives one end of a valve stem 38 secured in the cylindrical portion 20 of the pan 18 and having a passage through which the fluid may be forced into the chamber 33, it being understood that the valve stem 38 extends through the bag 30 in the manner customary in vehicle tire inner tubes and similar devices. The tubular conduit 36 passes through an aperture in the pans 18 and 19 and is secured by a nut 39 which bears against the pan 19 and draws the elbow 37 and a spacing ring 40 against the pan 18. A dust pan or cover plate 41 is mounted between the flange or collar 17 and the pans 18 and 19. This dust pan extends beyond the air venting grooves 12 in the wheel rim and has an axially directed flange 42 which overlies an extension portion 43 of the wheel rim.

An annular slide or ring 44 is interposed in the space between the frictional surface 27 of the friction element 26 and the face 10 of the brake drum 9. This slide is preferably formed of a high quality wear-resisting material having a relatively high coefficient of friction. A suitable material is that from which molded brake and clutch linings for automotive vehicles are customarily formed. Such material is relatively inelastic and in order to allow for circumferential expansion and contraction of the slide 44 in operation and otherwise, a series of slits 45 are formed therein alternately from opposite edges 46 and 47. The slits 45 extend beyond the center of the slide although they do not completely sever the same.

As shown in Fig. 4, the friction face 10 is received in the brake drum 9 to provide circumferential shoulders 48 and 49 which slidingly engage the edges 46 and 47, respectively, of the slide element 44, thus guiding the latter and preventing dislodgment of the slide from between the brake drum or member and the friction element. Preferably, in this embodiment of the invention, the outside diameter of the slide 44 is slightly greater than the diameter of the friction face 10, so that in placing the slide within the drum 9 the slide is circumferentially compressed or contracted and the inherent resiliency of the material of the slide tends to expand the same, holding the outer surface thereof against the friction face 10 while the inner surface of the slide is in confronting relation to the frictional surface 27 of the element 26, being separated therefrom by an annular space 50.

When a suitable fluid is forced into the bag chamber 33 through the conduit 34, the bag 30 expands and forces the friction element 26 radially outward so that the latter is brought into frictional engagement with the relatively movable part or member of the device. In the present instance the friction element 26 engages the slide 44, although the latter could be omitted so that the friction element would directly engage the face 10 of the brake drum 9. Upon engagement between the friction element 26 and the slide 44 when the wheel is rotated on the spindle or shaft 4, the rotation of the slide is first arrested since the coefficient of friction between the slide and the rubber friction element 26 is greater than between the slide and the metal face 10 of the brake drum. While the slide is frictionally held by the element 26 slippage occurs between the brake drum surface 10 and the outer surface of the slide. As the fluid pressure within the chamber 33 is increased, the friction element 26 is forced outwardly with greater force and slippage between the relatively rotating parts is increasingly resisted. The energy of rotation is converted into heat at the face 10 of the brake drum so that the latter becomes heated thereby and is cooled by air circulating through the grooves or passages 12 and 15, and through passages 14 in the drum 9 which connect the circumferential passage 15 with the interior of the brake drum. Desirably, passages 13 through the pans 18 and 19 and the cover 41 allow air to circulate through the interior of the brake during rotation of the wheel.

In resisting the relative rotational movement between the members the friction element is subjected to a torque load which tends to shift the same circumferentially on the stationary member composed of the pans 18 and 19. Reinforcing elements or pins 53 are embedded in the body portion of the friction element 26 inwardly of the grooves 28 and the frictional face 27 and are disposed in parallel relation to one another around the periphery of the friction element. These pins may be formed of numerous strong tough materials, preferably a metal such as brass, steel or other iron alloy. Desirably, the pin elements are placed in the body of the friction element before the latter is cured, so that a secure bond is established between the rubber and metal during vulcanization. Suitable formations, such as radial slots 54, are formed in the flanges 22 and 23 which define the side walls of the channel holding the deformable friction element. Ends 55 and 56 of the pins 53 extend laterally beyond the side walls of the friction element and are received in the slot formations 54 so as to be interlocked therewith and thereby resist circumferential shifting movement of the friction element in the channel. Preferably, the sides of the friction element are disposed against the side flanges 22 and 23 of the channel. As shown in Fig. 1, the slot formations 54 have considerable radial extent, thus permitting extreme radial movement of the friction element toward and away from the friction face of the other member. The width of the slots 54 is, however, but slightly greater than the thickness of the pins 53, so that the ends of the pins are closely confined by the sides of the slots and the possible circumferential shifting of the friction element is held to a minimum. During a braking action in which the friction element 26 is forced radially outward by the fluid pressure in the bag 30, slippage occurs between the slide 44 and the friction face 10 of the drum. As the energy is dissipated in the form of heat the wheel is gradually brought to rest, so that relative rotational movement between the members of the device is arrested. Upon release of the fluid from the bag 30, the inherent elasticity of the friction element 26 causes the same to contract circumferentially and move away from the drum member and the slide 44, thus releasing the brake. This contraction of the friction element by its own resiliency is very important since the rubber of the element which is brought into frictional engagement with the relative rotating parts of the brake also serves to contract the element and withdraw the frictional surface 27 from frictional engagement with the slide. Also during the expansion of the friction element the reinforcing pins 53 move radially in the slots 54. Accordingly, while a relatively soft deformable rubber composition is provided to establish the frictional grip between the relatively rotating parts of the device, hard strong pins are provided to resist the circumferential shifting or distortion of the soft rubber element which would otherwise occur.

Figure 6:
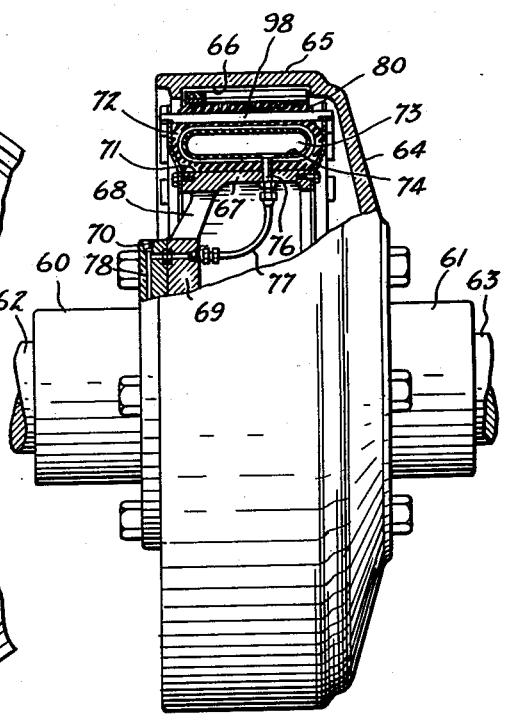
Fig. 6 is a side elevational view, partly in section and with parts broken away, showing the clutch of Fig. 5.
Figure 7:
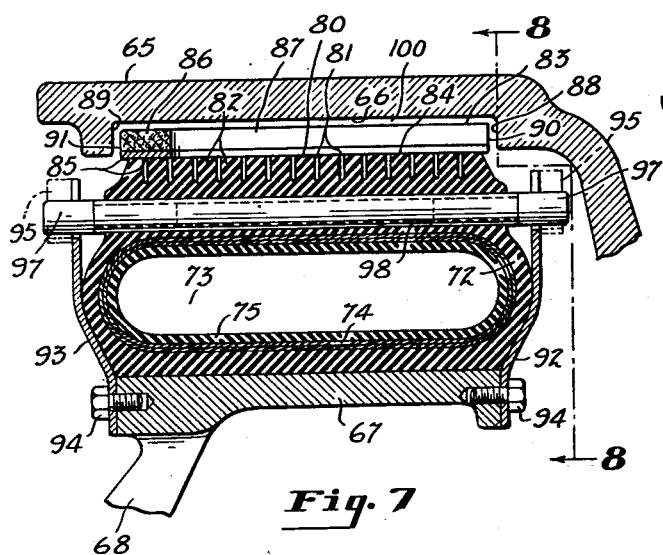
Fig. 7 is an enlarged sectional detail of the clutch friction element and friction drum taken substantially on the line 7—7 of Fig. 5.
Figure 8:
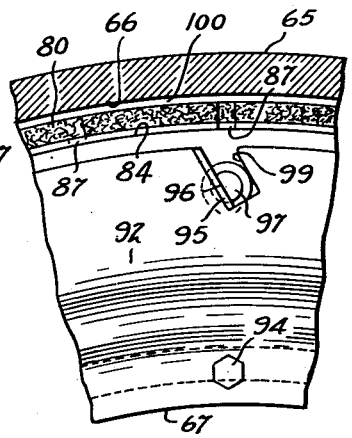
Fig. 8 is a fragmentary detail, partly in section, taken substantially on the line 8—8 of Fig. 7.

In Figs. 5 through 8 the invention is embodied in a clutch structure which comprises hub members 60 and 61 secured on shafts 62 and 63, respectively, which shafts are to be drivingly connected. One member of the clutch is secured to a collar or flange on the hub 61 and comprises a shell 64 having a substantially cylindrical drum 65 formed with an inwardly directed cylindrical friction face 66 corresponding to the face 10 of the brake drum 9 previously described. The other member of the clutch structure comprises an annular rim 67 having inwardly directed radial spokes 68 formed into a collar 69 secured to flange 70 on the hub 60.

Secured to outer cylindrical surface 71 of the member 67 is an elastic and deformable friction element 72 which has formed therein an annular fluid receiving chamber 73 through which the same may be inflated. Preferably, the friction element 72 is formed of an elastic rubber compound similar to that employed in the friction element 26 previously described. In this embodiment of the invention, however, the inflating chamber is formed integral with the portion of the friction element that frictionally establishes the driving connection between the relatively movable parts or members of the device. If desired, reinforcing means such as rubber coated cords 74 may be provided in the friction element 72 and around the fluid chamber 73, an inner lining or tube 75 being disposed inside the cords 74 to render the chamber 73 as nearly fluid tight as possible. Fluid under pressure may be introduced into the chamber 73 through an inlet valve stem 76 which extends through the rim 67 and is connected by a conduit 77 to passages 78 in the hub 60, these passages being placed in communication with a suitable source of fluid supply through a passage, not shown, in the shaft 62. The friction element 72 has an outwardly directed thickened body portion 80 in which grooves 81 and ribs 82 are formed corresponding to the ribs and grooves previously described in connection with the preceding figures. An annular slide 83 of flat cylindrical form is interposed between the inwardly directed friction face 66 of the drum 65 and outwardly directed frictional surface 84 of the friction element 72. The slide 83 may be formed of an annular band 85 of steel or the like to which is secured by rivets or the like a suitable wear-resisting material 86, such, for example, as brake lining of the character used in automobile brakes. The wear-resisting material 86 is relatively thin and shaped to conform to the curvature of the surfaces 66 and 84. Transverse slits 87 are formed in the slide 83 and correspond to the slits 45 previously described in connection with the slide 44. Thus, the slide 83 may expand and contract to accommodate itself to different diameters when in use. In this embodiment of the invention the slide 83 is normally of less diameter than the frictional surface 84 of the friction element 82. Accordingly, the band is slightly distended when the same is disposed about the friction element and the steel band 85 of the slide embraces the frictional surface 84 of the friction element. Annular shoulders 88 and 89 are formed in spaced parallel relation around opposite edges of the friction face 66 of the drum 65 to engage edges 90 and 91, respectively, of the slide 83 and prevent the latter from moving out of the space between the relatively movable parts of the clutch. A pair of side plates or rings 92 and 93 are disposed in spaced parallel relation to one another on opposite sides of the friction element 72 and are secured to the rim 67 by bolts 94 which are threaded into the rim. The rings 92 and 93 are circular in form and at their outer peripheries have struck out flanges 95, against which rest flattened sides 96 of end elements 97 secured as by a press fit in opposite ends of reinforcing pins 98 which are preferably of tubular form and are secured in the thickened body portion 80 of the friction element by vulcanization. The pins 98 correspond to the pins 53 previously described and the ends 97 thereof have interlocking engagement with the groove formations 99 formed when the projections 95 are struck from the marginal portions of the rings.

The projections 95 are disposed so that the bearing surfaces formed thereby are inclined toward the adjacent portion of the frictional surface 66 of the drum 65. Thus, as the friction element 72 is distended by inflation of the chamber 73, the pins 98 in moving radially outward carry the tips or ends 97 out of engagement with the supporting surfaces of the flanges 95. Upon circumferential shifting or displacement of the outer periphery of the friction element 72 when a torque load is imposed thereon, the ends 97 are again brought into engagement with the supporting surfaces of the struck out flanges 95 so that the latter can substantially arrest the shifting or circumferential deformation of the friction element and prevent injury thereto. The inclined character of the supporting surfaces of the flanges 95 creates a self-energizing characteristic in the clutch of the present invention since the greater the force tending to shift the friction element circumferentially relative to the rim 67, the greater will be the force tending to expand or move the friction element radially outward against the slide 83 to press the latter against the friction face 66.

As in the brake structure, the elastic friction element 80 is of such inherent resiliency that upon release of the pressure in the fluid chamber 73, the friction element contracts circumferentially so as to withdraw from the drum 65. The slide element 83 through its inherent resiliency also withdraws from the friction face 66, leaving an annular space 100 between the drum and slide.

In the clutch structure just described it is apparent that the rubber friction element 72 normally functions according to its natural characteristics of resiliency and elasticity. Engagement between the ends of the pins 98 and the inclined bearing surfaces of the flanges 95 occurs only after circumferential movement or distortion of the friction element. Therefore, until such deformation occurs the driving connection between the rotatable clutch parts is resiliently maintained through substantially the entire radial thickness of the friction element.

In Figs. 9 and 10 is illustrated a slide element of modified construction suitable for use in friction devices of the character described in place of the slide elements 44 and 83 previously mentioned. A flat cylindrical band 103 is formed of a suitable heat resistant friction material such as is commonly used in the manufacture of automotive brakes. For example, a composition plastic material containing primarily rubber and asbestos fibers has been found suitable, the same being molded and vulcanized or otherwise cured to the desired shape. This band is transversely split, as indicated at 104, to provide a gap which permits expansion and contraction of the slide element during operation of the device in the manner previously described. The width of the transverse split or gap 104 is sufficient to permit contraction of the band 103 to the minimum diameter to which it is to be reduced in operation.

On one side of the band 103, preferably the inside, is a recess 105 which receives a split ring or band 106 formed of a suitable strong resilient material such as brass or steel. Transverse split or gap 107 permits expansion and contraction of the ring 106 as the diameter of the slide element is changed during operation of the device. Preferably, the gap or split 107 is approximately diametrically opposed to or otherwise circumferentially spaced from the split or gap 104 in the friction band 103 so that they do not occur at the same part of the circumference of the slide element.

While the particular dimensions of the ring 106 are not critical, it is desirable, as shown in Fig. 10, that the width of the ring be a relatively small portion of the width of the band 103, such, for example, as about one-third or less of the total width of the slide element. Lateral shifting of the ring 106 is resisted by circumferentially extending shoulders 108 formed on the inside of the band 103 at the edges of the recess 105 and which engage the edges of the ring 106. Furthermore, both inside surface 109 of the friction band and exposed surface 110 of the ring 106 are approximately even or flush with one another so as to be simultaneously and concurrently engaged by the other parts of the friction device, such, for example, as the rubber annuluses or friction elements 26 and 72. Preferably, the metal ring 106 is relatively thin so as to be readily expanded or contracted upon alteration in diameter of the slide element during operation, the metal ring moving circumferentially relative to the band 103 and sliding in the recess 105 so that the element may adapt itself to the required diameter.

The present invention thus provides improved frictional devices for resisting relative rotational movement between members. Means are afforded to resist excessive or objectionable shifting and deformation of the rubber friction element which establishes the driving connection while such rubber element is arranged to withdraw itself from frictional engagement with the other member through inherent resiliency when the actuating fluid pressure is released.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:

1. In a device of the character described, a pair of members one of which is rotatable relative to the other, a friction face on one of the members, a deformable rubber friction element on the other member, means for moving the element into engagement with the face, and retaining pins embedded in the rubber element and secured therein by vulcanization, said pins being interlocked with the member carrying the friction element and movable toward and away from the friction face with the friction element.

2. In a device of the character described, a pair of members disposed one within the other, an annular friction face on one member, an annular deformable rubber friction element on the other member and in confronting relation to the friction face, means for moving the element into frictional engagement with the face, and retaining pins embedded in the rubber element, said pins being interlocked with the member carrying the friction element and movable toward and away from the friction face with the friction element.

3. In a device of the character described, a pair of members disposed one within the other, an annular friction face on one member, an annular deformable rubber friction element on the other member and in confronting relation to the friction face, means for moving the element into frictional engagement with the face, retaining pins embedded in the rubber element and extending laterally therefrom, and stops on the member carrying the friction element, said stops being engageable with the pins to resist circumferential movement of the friction element on the member carrying the same.

4. In a device of the character described, a pair of members one of which is rotatable relative to the other, a friction face on one of the members, an annular channel having side and bottom walls in the other member, a deformable rubber friction element disposed in the channel, means for moving the friction element toward the face, retaining pins embedded in the rubber element and extending laterally therefrom, and formations in the side walls of the channel to receive the pins and through interlocking engagement therewith resist longitudinal shifting of the friction element in the channel while allowing for movement of the friction element toward the friction face.

5. In a device of the character described, a pair of members one of which is rotatable relative to the other, a friction face on one of the members, an annular channel having side and bottom walls in the other member, a deformable rubber friction element disposed in the channel, means for moving the friction element toward the face, retaining pins embedded in the rubber element and extending laterally therefrom, formations in the side walls of the channel to receive the pins and through interlocking engagement therewith resist longitudinal shifting of the friction element in the channel while allowing for movement of the friction element toward the friction face, and an annular slide interposed between the friction face and the friction member to separate the same, said slide having a greater resistance to slippage on the friction element than on the friction face.

6. In a device of the character described, a pair of members one of which is rotatable relative to the other, a friction face on one of the members, an annular channel having side and bottom walls in the other member, a deformable rubber friction element disposed in the channel, means for moving the friction element toward the face, retaining pins embedded in the rubber element and extending laterally therefrom, and slots in the channel side walls to receive the pins, said slots being radially disposed for radial movement of the pins therein.

7. In a device of the character described, a pair of members one of which is rotatable relative to the other, a friction face on one of the members, a deformable rubber friction element on the other member, means for moving the element toward the face, a retaining pin embedded in the rubber element, and a stop on the element carrying member for limiting the movement of the pin, said stop having a pin engaging surface inclined toward the friction face.

8. In a device of the character described, an outer member having a substantially cylindrical inwardly directed friction face, an inner member having an annular channel with side and bottom walls, an annular elastic and deformable friction element disposed in the channel, means defining a fluid chamber between the friction element and the bottom of the channel, a conduit through which fluid may be supplied to the chamber to expand the same and force the friction element outwardly toward the friction face, thereby stretching the element, said element being adapted, upon release of fluid from the chamber, to contract by inherent resiliency and withdraw radially from the friction face, and metal pins embedded in the rubber of the friction element and extending laterally therefrom, said pins having interlocking engagement with the channel walls to resist shifting of the friction element in the channel.

9. In a device of the character described, a wheel of light metal having peripheral tire receiving means, a drum member of hard metal secured to the wheel and having a substantially cylindrical inwardly directed friction face, a member having an outwardly directed annular channel disposed within the drum, an annular elastic rubber friction element in the channel, a frictional surface on the outer periphery of the element, expandable fluid receiving means for forcing the element outwardly toward the friction face while stretching the element circumferentially, and metal elements embedded in the friction element adjacent the frictional surface thereof, said elements having interlocking engagement with the channel walls to resist excessive circumferential shifting of the friction element while being freely movable toward and away from the friction face between the normal limits of movement of the friction element.

10. In a device of the character described, a wheel of light metal having peripheral tire receiving means, a drum member of hard metal secured to the wheel and having a substantially cylindrical inwardly directed friction face, the wheel periphery being disposed in embracing relation about the drum, air circulating passages between the wheel and drum, a member having an outwardly directed annular channel disposed within the drum, an annular elastic rubber friction element in the channel, a frictional surface on the outer periphery of the element, expandable fluid receiving means for forcing the element outwardly toward the friction face while stretching the element circumferentially, and metal elements embedded in the friction element adjacent the frictional surface thereof, said elements having interlocking engagement with the channel walls to resist excessive circumferential shifting of the friction element while being freely movable toward and away from the friction face between the normal limits of movement of the friction element.

11. In a device of the character described, a wheel of light metal having peripheral tire receiving means, a drum member of hard metal secured to the wheel and having a substantially cylindrical inwardly directed friction face, a member having an outwardly directed annular channel disposed within the drum, an annular elastic rubber friction element in the channel, a frictional surface on the outer periphery of the element, a cylindrical slide within the drum and disposed against the friction face thereof, said slide normally being in spaced relation to the frictional surface of the friction element, expandable fluid receiving means for forcing the element outwardly toward the friction face while stretching the element circumferentially, and metal elements embedded in the friction element adjacent the frictional surface thereof, said elements having interlocking engagement with the channel walls to resist excessive circumferential shifting of the friction element while being freely movable toward and away from the friction face between the normal limits of movement of the friction element.

12. In a device of the character described, a pair of members mounted for relative rotative movement, an annular cylindrical friction surface on one of the members, an annular deformable and resilient friction element mounted on the other member and having an annular, substantially cylindrical friction face disposed in confronting relation to said friction surface, said element being circumferentially continuous and formed of elastic rubber composition, means for expanding the element circumferentially to force the same into frictional engagement with said surface, the element being adapted to contract by inherent resiliency upon release of the expanding means to withdraw radially from said friction surface, support means extending radially along the sides of the friction element and secured to said other member, and rigid elements embedded in the friction element and extending laterally therefrom, said elements having interfitting engagement with the support means to resist circumferential movement of the element relative to the member mounting the same.

13. In a device of the character described, a pair of members one of which is rotatable relative to the other, a friction face on one of the members, a friction element of rubber or the like on the other member, means for moving the element into engagement with the face, and retaining pin means embedded in the friction element and extending laterally therefrom, said pins being interlocked with the member carrying the friction element and movable while so interlocked toward and away from the friction face with the friction element.

14. In a device of the character described, a pair of members mounted one within the other for relative rotative movement, an inwardly directed annular friction face on the outer member, a friction element of rubber or the like on the inner member and disposed in confronting relation to said face, means for moving the element into engagement with the face, retaining pin means embedded in the friction element and extending laterally therefrom, and stop means on the inner member, said stop means being engageable with the pin means to resist circumferential movement of the friction element on the inner member.

HERMAN T. KRAFT.
WILLIAM C. McCOY.